(12) United States Patent
Genty De La Sagne et al.

(10) Patent No.: US 8,297,551 B2
(45) Date of Patent: Oct. 30, 2012

(54) MOVABLE MAIN UNDERCARRIAGE FOR AN AIRCRAFT

(75) Inventors: Jaime Genty De La Sagne, Toulouse (FR); Olivier Cazals, Daux (FR)

(73) Assignee: Airbus Operations (S.A.S.), Toulouse (FR)

( * ) Notice: Subject to any disclaimer, the term of this patent is extended or adjusted under 35 U.S.C. 154(b) by 295 days.

(21) Appl. No.: 12/721,083

(22) Filed: Mar. 10, 2010

(65) Prior Publication Data
US 2010/0237188 A1    Sep. 23, 2010

(30) Foreign Application Priority Data

Mar. 17, 2009   (FR) ...................................... 09 51680

(51) Int. Cl.
*B64C 25/14*   (2006.01)
(52) U.S. Cl. ................ 244/102 R; 244/102 A
(58) Field of Classification Search .............. 244/102 R, 244/102 A
See application file for complete search history.

(56) References Cited

U.S. PATENT DOCUMENTS

| | | | |
|---|---|---|---|
| 1,716,736 A * | 6/1929 | Reilly | 244/102 R |
| 1,878,768 A | 9/1932 | Gabbert | |
| 2,220,456 A | 11/1940 | Mercier | |
| 3,083,937 A * | 4/1963 | Bainbridge et al. | 244/102 R |
| 3,261,574 A * | 7/1966 | Bowdy | 244/102 R |
| 3,544,043 A * | 12/1970 | Stratford | 244/104 R |

FOREIGN PATENT DOCUMENTS

FR    891 386 A    3/1944

OTHER PUBLICATIONS

French Search Report issued in French Patent Application No. 0 951 680 on Nov. 4, 2009 (with translation).

\* cited by examiner

*Primary Examiner* — Christopher P Ellis
*Assistant Examiner* — Medhat Badawi
(74) *Attorney, Agent, or Firm* — Oliff & Berridge, PLC

(57) ABSTRACT

The airplane comprises a fuselage having frames, and at least two undercarriages each comprising a support and at least one wheel, the support being carried directly by the fuselage and being hinged to the fuselage about an axis that lies outside the frames.

The undercarriage is movable between an operational position in which the or each wheel is vertical, and a rest position. The support and the wheel have a configuration such that, in the rest position, the undercarriage extends circumferentially relative to the fuselage and outside the frames.

13 Claims, 5 Drawing Sheets

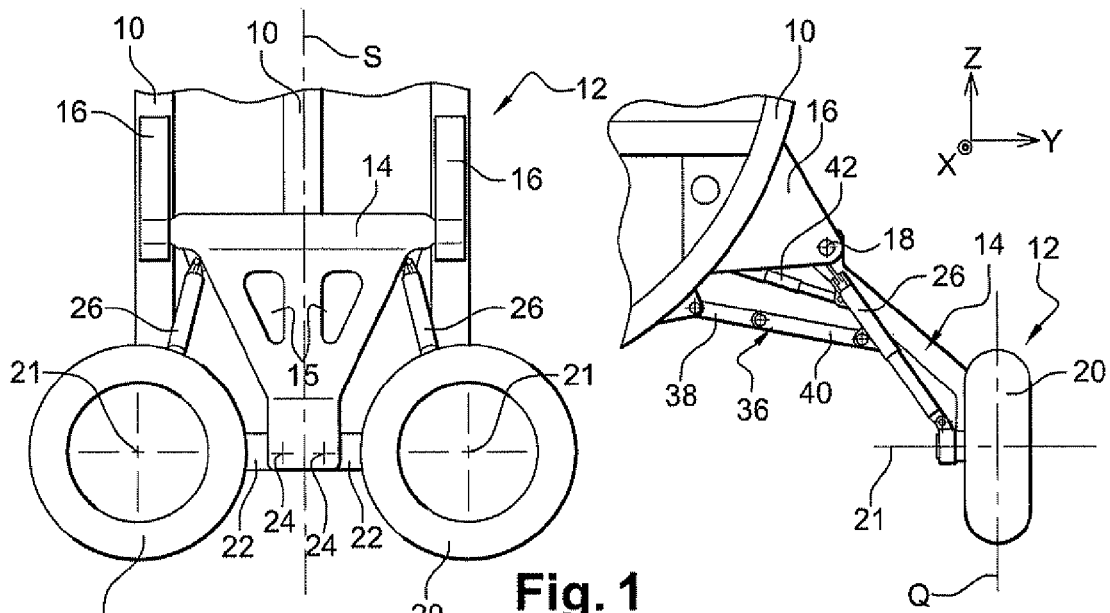
Fig. 1
Fig. 2
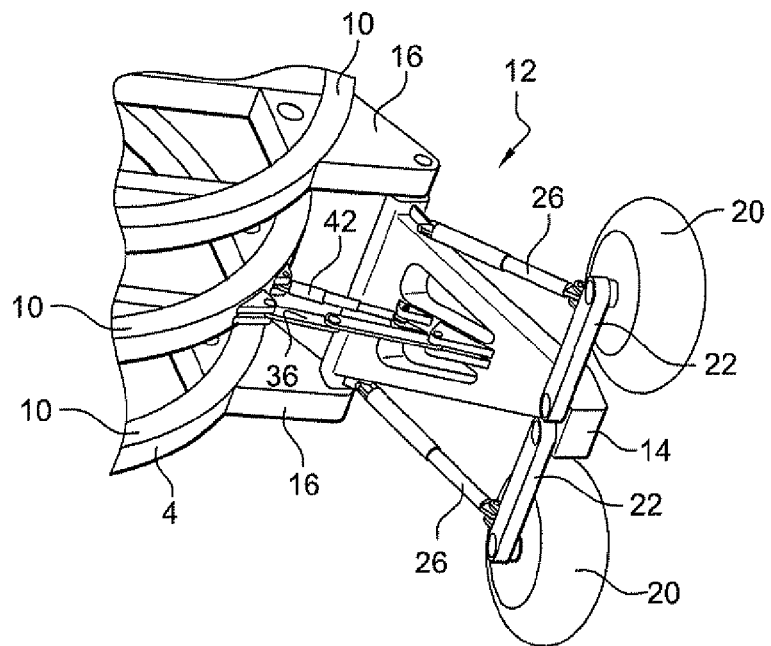
Fig. 3

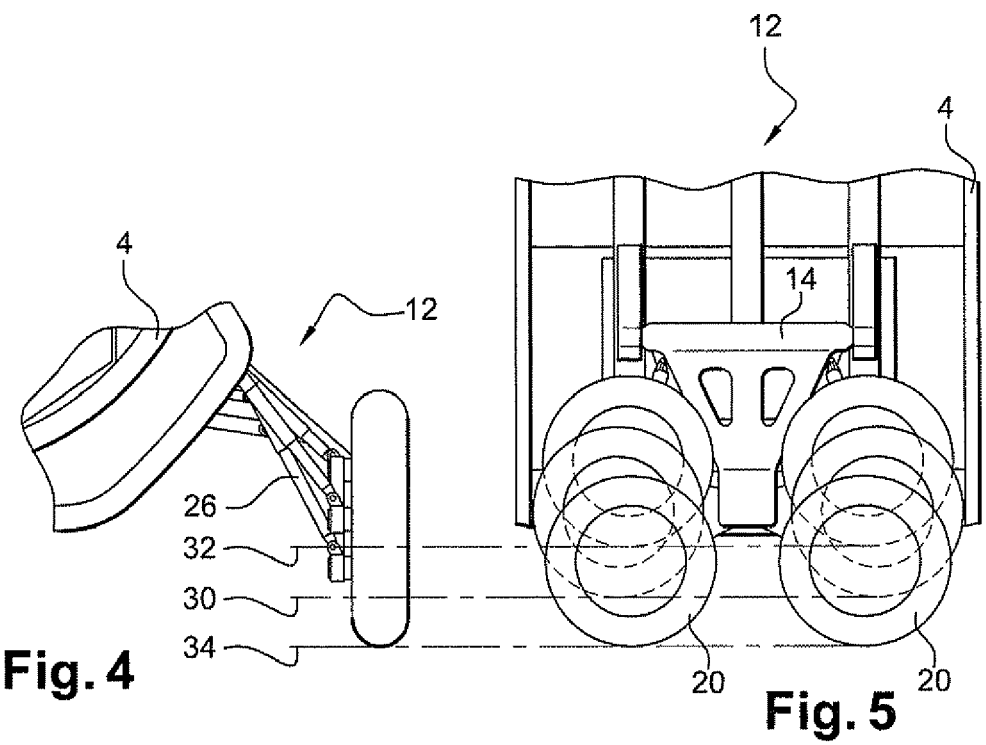
Fig. 4
Fig. 5
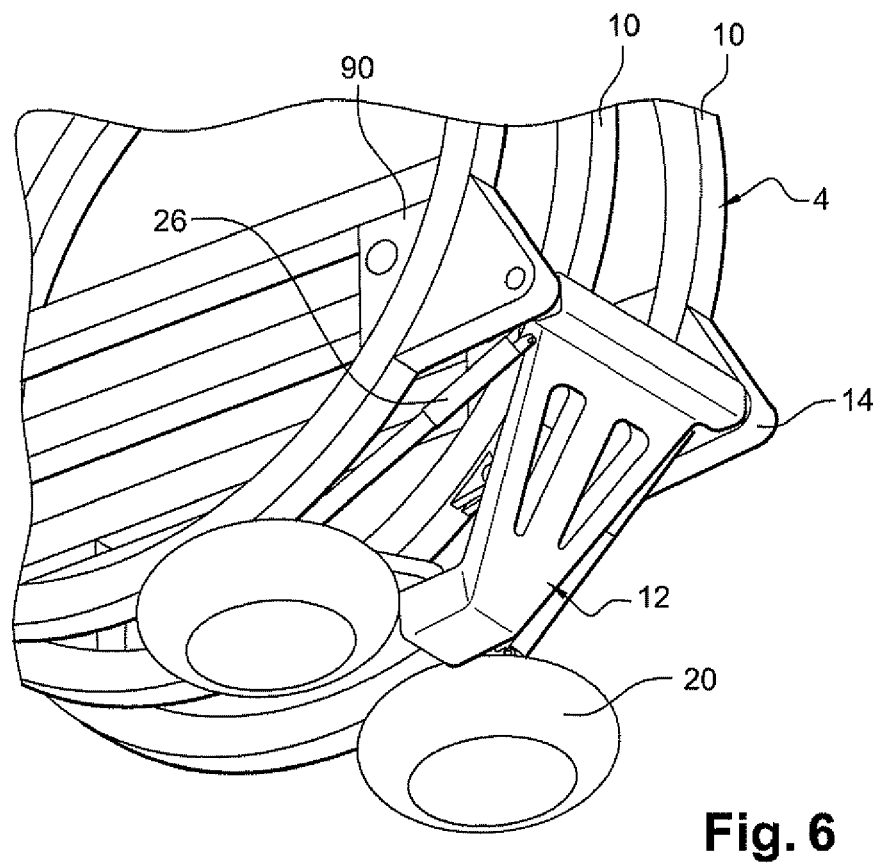
**Fig. 6

MOVABLE MAIN UNDERCARRIAGE FOR AN AIRCRAFT

FIELD OF THE INVENTION

The invention relates to undercarriages for aircraft.

BACKGROUND OF THE INVENTION

It is known to provide an airplane with nose landing gear and with a plurality of main undercarriages, e.g. two of them. Each of the main undercarriages comprises four wheels, for example, disposed in a so-called twin-wheel configuration. There is thus a front axle carrying two wheels on a common axis and a rear axle likewise carrying two wheels on a common axis. The undercarriage is movable and capable of occupying a retracted or rest position. The fuselage has frames that are interrupted in the vicinity of the undercarriage to provide the volume required for connecting the undercarriage to the fuselage and for receiving the undercarriage in its retracted position.

Nevertheless, the wheel box designed to receive the undercarriage therefore occupies space in the bottom portion of the fuselage. As a result, the volume available in the fuselage, e.g. volume suitable for use as holds, is therefore reduced.

Furthermore, the undercarriages present a structure and a linkage that are complicated. They generally do not move very far.

OBJECT AND BRIEF SUMMARY OF THE INVENTION

An object of the invention is to provide an aircraft that mitigates those problems.

Thus, the invention provides an airplane that comprises a fuselage having frames, and at least two undercarriages each comprising a support and at least one wheel, the support being directly carried by the fuselage and being hinged to the fuselage about an axis lying outside the frames; each undercarriage being movable between an operational position in which the or each wheel is vertical, and a rest position; and the support and the wheel having a configuration such that, in the rest position, the undercarriage extends circumferentially relative to the fuselage and outside the frames.

Thus, the undercarriage does not penetrate into the fuselage in the rest position. The inside volume of the fuselage, in particular the volume used as holds, is therefore not penalized. In this sense, the undercarriage may be said to be non-invasive relative to the fuselage. This avoids making cutouts in the fuselage and weakening its structure, which would otherwise require additional structural reinforcement. Furthermore, since the undercarriage fits closely to the outlined shape of the fuselage, the volume occupied under the fuselage by the undercarriage is small.

Advantageously, the axis lies outside the fuselage relative to a horizontal direction perpendicular to a longitudinal direction of the fuselage.

Advantageously, the support is of a shape such that, in the operational position, the or each wheel extends outside the axis relative to a horizontal direction perpendicular to a longitudinal direction of the fuselage, and preferably outside the fuselage relative to the same direction.

This increases the width of the track defined by the wheels, and increases the stability of the aircraft in taxiing.

Advantageously, the support presents a profile that is angled when seen looking along a direction parallel to the longitudinal direction of the fuselage.

Such a shape is particularly suitable for enabling the undercarriage to fit closely to the shape of the fuselage.

Advantageously, the or each wheel is connected to the support by an arm hinged to the support.

It is thus possible to allow the wheel to move vertically, in particular to move vertically through a considerable distance, if the arm is dimensioned for that purpose.

In the context of the invention, provision is also made for the wheels of each undercarriage to be at least two in number, all of the wheels of the undercarriage forming a single row of wheels disposed one behind another.

This disposition for the wheels thus enables the volume of the undercarriage to be reduced in the vertical and transverse directions. The undercarriage may thus occupy a wheel box of small volume. Since the volume of the undercarriage is reduced, the same applies to its weight and to the structural forces it generates on the aircraft. The undercarriage may also present an arrangement that is simpler, thereby simplifying maintenance of the undercarriage. Finally, the problem of air noise that generally occurs with twin wheels because of air passing between them disappears because the wheels are in alignment.

Advantageously, each undercarriage has a single wheel.

Thus, the structure of the undercarriage and of its mechanism are particularly simple.

Advantageously, the support is a single part mounted to pivot relative to the fuselage, each undercarriage including at least one arm connected directly to the or each wheel and to the support.

Advantageously, each undercarriage includes at least one shock absorber, the or each shock absorber being distinct from the support, the support and the or each shock absorber preferably being connected to the or each wheel independently of one another, the shock absorbers being at least two in number, for example, and being associated with respective wheels of the undercarriage.

Since the support does not constitute the shock absorbers, maintenance of the undercarriage is further facilitated.

Advantageously, each undercarriage is arranged in such a manner as to present a plane of symmetry perpendicular to the longitudinal direction of the fuselage.

This thus makes it possible to simplify fabrication of the undercarriage and to simplify its maintenance. If the undercarriage has a plurality of wheels, the wheels present a community of arrangements and behaviors, e.g. the front wheel is in a "push-wheel" configuration and the rear wheel is in a "pull-wheel" configuration.

Advantageously, the undercarriages are arranged in such a manner as to be symmetrical relative to each other about the longitudinal vertical midplane of the fuselage.

Once more, fabrication and maintenance of the undercarriage are simpler.

Preferably, each undercarriage has at least two connections to at least two of the frames, these connections being independent of each other.

Thus, the forces transmitted by the undercarriage are taken up directly by the frames of the fuselage without there being any need to provide any intermediate parts that might increase the weight of the aircraft.

Advantageously, the aircraft has an undercarriage hatch that is mounted to move relative to the fuselage, the hatch being movably mounted so that it approaches a vertical longitudinal midplane of the fuselage when the hatch is opened.

Such a hatch may close after releasing the passage for deploying the undercarriage.

Advantageously, the aircraft has an undercarriage hatch that is fastened directly to the undercarriage support.

Thus, this hatch presents an arrangement that is particularly simple.

Advantageously, the aircraft includes a locking scissor link, that is locked in the operational position and unlocked in the rest position.

Advantageously, the aircraft has a raising actuator for deploying and raising the undercarriage.

BRIEF DESCRIPTION OF THE DRAWINGS

Other characteristics and advantages of the invention appear further from the following description of preferred embodiments and of a variant, given as non-limiting examples with reference to the accompanying drawings, in which:

FIGS. 1 to 3 are respectively a side view, a front view, and a perspective view from below of an undercarriage of an aircraft in a first embodiment of the invention;

FIGS. 4 and 5 are views analogous respectively to FIGS. 2 and 1 showing the vertical travel of the wheels of the FIG. 1 undercarriage;

FIG. 6 is a perspective view of the aircraft showing the undercarriage in the retracted position;

MORE DETAILED DESCRIPTION

There follows a description of a first embodiment of the aircraft of the invention with reference to FIGS. 1 to 11.

Figure 12:
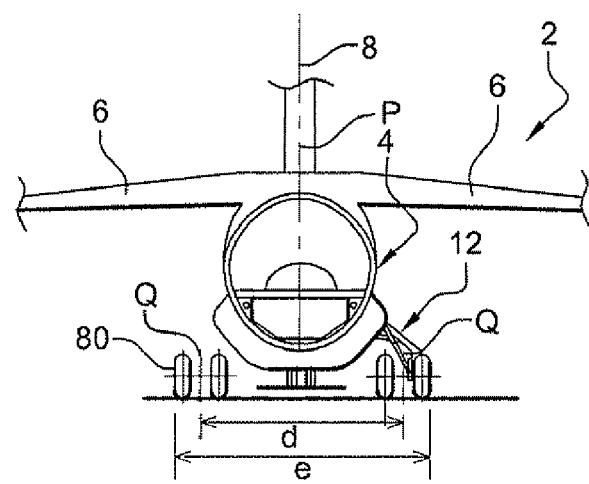
FIG. 12 is a fragmentary front view of the aircraft having superposed thereon a view of an aircraft having landing gear with pairs of wheels.

In the present embodiment, the aircraft of the invention is an aerodyne, and in particular an airplane 2 as can be seen in FIG. 12 in particular. The airplane 2 has a fuselage 4, two wings 6, and a tail fin 8. It has a plurality of engines that are not shown.

Figure 10:
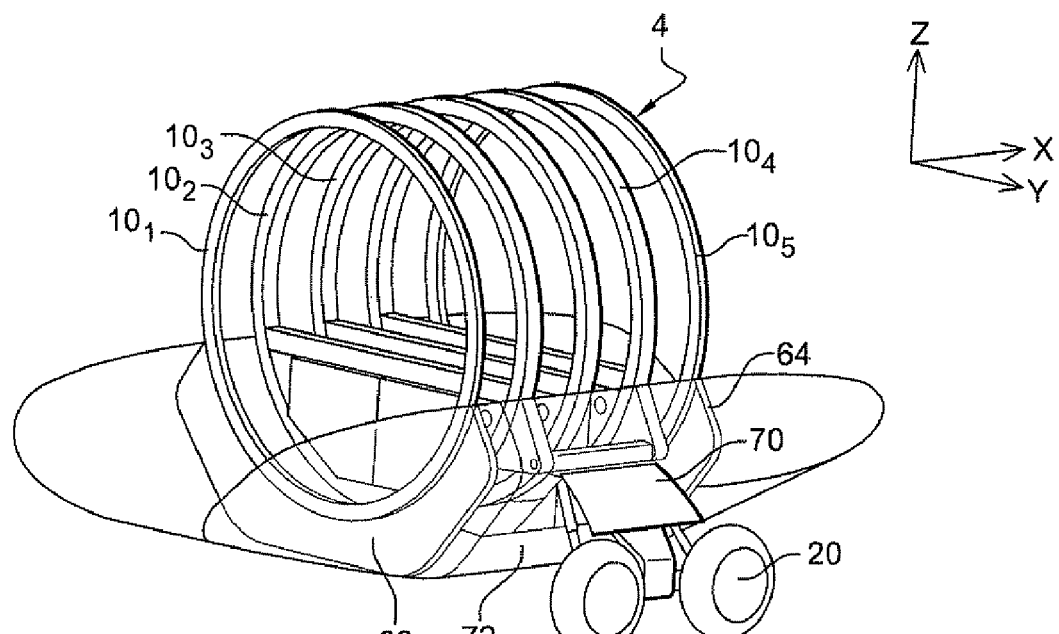
FIG. 10 is a fragmentary perspective view of the aircraft with the undercarriage in the extended position.

In conventional manner, use is made below of an orthogonal reference frame X, Y, Z as shown in particular in FIGS. 2 and 10, in which reference frame the direction X designates the longitudinal horizontal direction of the fuselage and the direction Y designates the horizontal direction perpendicular to the direction X. The direction Z is vertical and perpendicular to the directions X and Y.

Over the major fraction of its length, the fuselage 4 is cylindrical in shape, and specifically it comprises strength members 10 that are embodied, in this example, by plane circular frames. The frames 10 define the general shape of the fuselage. They extend parallel to one another, being regularly spaced apart from one another, and they are disposed about a common axis to give the fuselage its cylindrical shape.

Each of the frames 10 is an element forming part of the structure of the airplane. It extends in a plane perpendicular to the longitudinal axis X of the airplane. Specifically, it is a continuous section member in the form of a convex closed curve, e.g. one that is substantially circular or egg-shaped. If it is egg-shaped, it presents a vertical axis of symmetry. It may also present the shape that is slightly flattened in the vertical direction so that it is shorter along the Z axis than along the Y axis.

Figure 8:
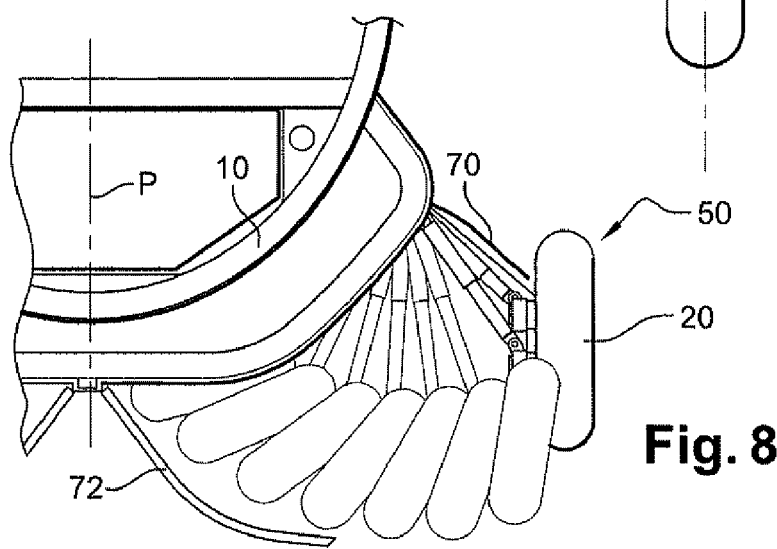
FIG. 8 is a front view of a portion of the aircraft showing the travel of the undercarriage while it is being extended, together with the hatches of the wheel box.
Figure 9:
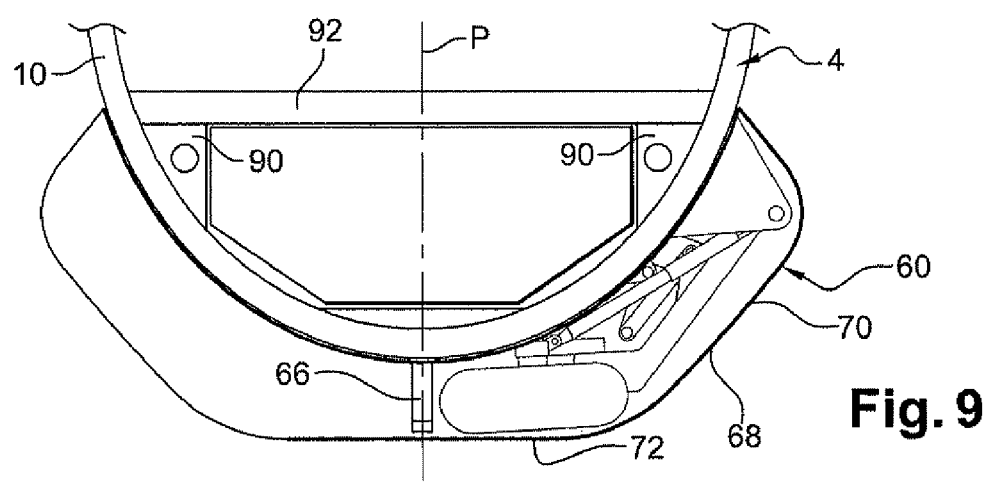
FIG. 9 is a fragmentary section view on a plane perpendicular to the longitudinal axis of the aircraft, showing the undercarriage in the retracted position.

The airplane 4 has a plurality of undercarriages. Firstly it has nosegear, not shown in detail. It also has main landing gear, specifically two undercarriages. The description below relates to the starboard or right main undercarriage 12. The left undercarriage that is not shown is symmetrical thereto about the longitudinal vertical midplane P of the aircraft and of its fuselage. This plane, shown in FIGS. 8, 9, and 12, is thus parallel to the directions X and Z.

The undercarriage 12 comprises a support 14 constituted specifically by a rigid one-part main leg. The leg 14 has its top portion hinged to two frames 10 via two respective yokes 16 rigidly fastened to respective frames. Each yoke is generally triangular in shape in the embodiment shown and lies in the plane of the associated frame. The yoke may present any other shape. Each yoke is fastened to the outside face of the frame. The leg is hinged to one end of the yoke, and it in the example shown, to the vertex of the triangle formed by the yoke that is furthest from the corresponding frame. The two yokes extend parallel to each other and facing each other. The top end of the leg 14 is located between the two yokes. It is hinged about an axis 18 that runs along said end and through the two yokes. This axis is parallel to the direction X. It can thus be seen that the undercarriage 12 has two connections to two respective frames, these connections being independent of each other. The undercarriage is disposed in such a manner that on passing from its extended (or operational) position to its retracted (or rest) position, it moves towards the plane P.

As can be seen in particular in FIGS. 2, 7, 9, and 12, the axis 18 lies outside the fuselage, and in particular outside the frames 10, in particular in the direction Y. Thus, the image of the axis 18 when projected in the direction Z does not lie on the fuselage. The undercarriage 12 has wheels 20, specifically two wheels in the present example. Nevertheless, the invention also applies to an undercarriage having a number of wheels that is smaller than two or that is a multiple thereof.

In this example, all of the wheels of the undercarriage 2 occupy a single row of wheels placed one behind the other. The two wheels thus extend in line one after the other. As can be seen in the front view of FIG. 2, the front wheel therefore hides the rear wheel. With reference to the plane of symmetry Q of each wheel, which plane is perpendicular to the axis of rotation 21 of the wheel, said plane is common to both wheels. The wheels are located in such a manner that, when the undercarriage is in its operational position, the plane Q lies outside the fuselage relative to the direction Y, and indeed outside the hinge axis 18. The projection of the wheels in the direction Z therefore does not lie on the fuselage. Consequently, the wheels also extend at a distance from the midplane P, and even at a distance therefrom that is greater than the distance of the axis 18 therefrom.

The undercarriage 12 has two swinging arms 22 associated with respective ones of the wheels. Each wheel is mounted to rotate at a distal end of the arm, while a proximal end of the arm is mounted to pivot about a bottom end of the leg 14. FIG. 1 thus shows the axes of rotation 21 of the wheels movably mounted on the arms, and the pivot axes 24 of the arms movably mounted on the leg. The axes 21 and 24 are parallel to the direction Y when the undercarriage is in its operational or extended position.

As can be seen in FIG. 2, the leg presents an angled profile giving it a V-shape when seen in a direction parallel to the direction X. The angle forms a bend marking the boundary between an upper portion and a lower portion of the leg, each portion being flat in shape. In the operational or extended position of the undercarriage, the lower portion is parallel to the directions X and Z, while the other portion is parallel to the direction X but inclined relative to the direction Z, extending generally towards the central longitudinal axis of the fuselage.

In side view, the leg of this example is generally in the shape of an upside-down triangle with its top side extending horizontally. It presents two triangular openings 15.

The undercarriage 12 also presents two shock absorbers 26 associated with respective ones of the wheels. For each wheel, the shock absorber has its proximal top end fastened to the top portion of the leg 14, while its distal bottom end is fastened to the associated arm 22 close to the axis of rotation 21 of the wheel. The ends of the shock absorbers are connected to the leg and to the arms by means of ball joints, in the present example by means of yoke ball joints. The shock absorbers 26 in the present example are telescopic and tend to urge the wheels downwards, away from the fuselage. These shock absorbers provide the suspension of the undercarriage. Thus, the shock absorbers are separate from the support, the support and each shock absorber being connected to the associated wheel independently of each other.

FIGS. 4 and 5 show the travel stroke of each wheel. The middle line 30 shows the position of the bottom end of the wheel and the position of the shock absorber when the undercarriage is in the static state. By way of example, this is the situation in which the undercarriage is supporting the airplane on the ground and the airplane is at rest. The arms are then horizontal. The top line 32 shows the position of the wheel and the shock absorber in the compressed state at the end of a stroke, while the bottom line 34 shows the position of the wheel with the shock absorber in the relaxed state. By way of example, this is the situation in which the airplane is no longer standing on the ground via its main landing gear. It is in this configuration of the wheels that the landing gear occupies its retracted position, as described below.

The movements of the swinging arms 22 and the stroke of the shock absorbers 26 enable the wheels to move through an amplitude that, in this example, is 600 millimeters (mm) (or even more, e.g. 700 mm) between the two extreme positions defined by the lines 32 and 34, i.e. undercarriage compressed and undercarriage relaxed.

The undercarriage 12 also has a scissors link 36 made up of two arms 38 and 40 that are hinged to each other. The top arm 38 is also hinged via a yoke to one of the frames 10. The bottom arm 40 is hinged via a yoke to the upper portion of the leg 14, in a middle zone thereof. Finally, the undercarriage 12 includes a raising actuator 42, likewise hinged at a proximal end and via a yoke to one of the frames 10, and at its distal end and via a yoke to the upper portion of the leg 14. All of the hinge axes of the scissors link and of the actuator are parallel to the direction X.

The undercarriage 12 presents a plane of symmetry S parallel to the directions Y and Z and containing the frame to which the scissors link and the actuator are fastened. The scissors link 36 and the actuator 42 both lie in this plane of symmetry. The arrangement of the wheels, of the swinging arms, and of the shock absorbers, in particular, presents such symmetry.

Furthermore, the two main undercarriages are symmetrical to each other about the plane P, as mentioned above. This applies when they are in the retracted position as well as when they are in the extended position.

Figure 7:
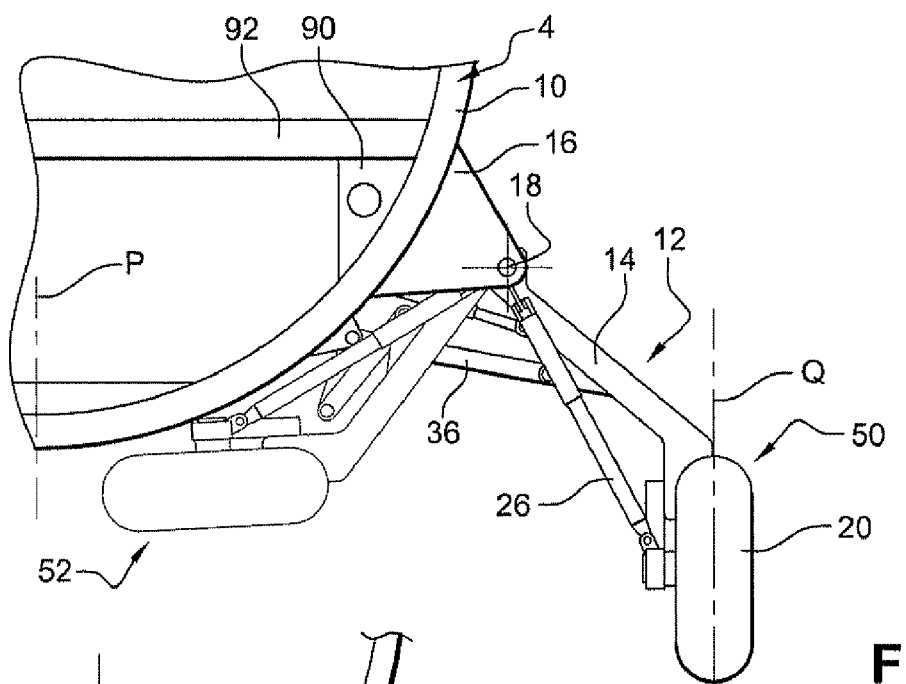
FIG. 7 is a view analogous to FIG. 2 showing the extended and retracted positions of the undercarriage.

As can be seen in particular in FIG. 7, by means of this arrangement, the undercarriage 12 is hinged to the fuselage and is thus pivotally movable between an extended or operational position 50 in which the plane Q of the wheels is vertical, and a retracted or rest position 52 in which the same plane Q is close to a horizontal orientation. With the undercarriage in the extended position, the wheels lie at a distance from the fuselage, while in the retracted position, the wheels lie in the immediate proximity of the frames. It can thus be seen that in the retracted position, the undercarriage lies under the fuselage, circumferentially relative thereto. The circumference can be seen in section in a plane perpendicular to the direction X. It fits closely to the shape of and runs along the perimeter of the fuselage. In this position, the entire undercarriage still lies outside the fuselage. Furthermore, the undercarriage does not reach the plane P, such that the left and right undercarriages can be arranged symmetrically under the fuselage without interfering with each other. FIG. 8 shows certain intermediate positions that are occupied by the undercarriage as it moves from the extended configuration to the retracted configuration.

The forces generated in the undercarriage and transiting via the yokes 16 carrying the leg are taken up by the frames 10, by structural reinforcements 90 that can be seen in particular in FIG. 9, and by floor cross-members 92. The cross-members are rigid section members extending in the direction Y and having their ends connected to the frames and to the reinforcements 90. The reinforcements are likewise connected to the frames, under the cross-members.

Provision is made in the present example for the airplane to include a belly fairing 60 that defines a closed housing under the fuselage for receiving each of the main undercarriages. This fairing is shaped and dimensioned so as to minimize its volume and thus minimize the area of its wetted surfaces. In the closed position it completely surrounds the entire undercarriage that is thus protected inside the fairing from external elements. The fairing thus forms a "wheel box" extending under the frames 10. As can be seen in particular in FIG. 10, the wheel box in the present example is defined by five frames. Thus, the first frame $10_1$ of the series starting from the front carries the front wall 62 of the wheel box while the fifth frame $10_5$ carries the rear wall 64. The frames $10_2$ and $10_4$ are the frames to which the leg 14 is fastened. The middle frame, number $10_3$, carries the scissors link and the raising actuator.

The wheel box 60 also includes a longitudinal partition 66 subdividing it into two compartments, each dedicated to a respective one of the left and right undercarriages.

The wheel box wall is formed by a thin structure 68. The major portion of this wall is stationary. Nevertheless, in the present example, two movable hatches are formed in this wall.

A first one of these hatches is an upper hatch 70 constituting a main leg fairing. In the present example, this hatch is rigidly fastened to the leg 14 and, when the undercarriage is extended, it overlies the leg, at a distance therefrom. Like the leg, the hatch is thus likewise pivotally mounted relative to the fuselage about an axis parallel to the direction X. The hatch is shown in its closed and open positions in FIG. 8. It is placed in such a manner that it moves away from the plane P while it is opening. During this movement, it passes through the vertical plane containing its pivot axis. Whatever its position, the major fraction of the hatch extends below its pivot axis.

The wheel box described also comprises a bottom hatch movably relative to the fuselage and relative to the undercarriage 12. Whereas the leg fairing hatch pivots sideways while it is opening, the bottom hatch 72 pivots downwards while it is opening. During this movement, it moves closer to the plane P. Whatever its position, in the present example of the right undercarriage, the hatch always lies on the right of its pivot axis. The corresponding hatch associated with the left undercarriage always lies to the left of its pivot axis.

The pivot axes of the hatches are parallel to the direction X. The upper hatch 70 remains open when the undercarriage is extended. In contrast, the bottom hatch 72 may be reclosed once the undercarriage is extended. This arrangement with two hatches imparts good rigidity thereto.

Figure 11:
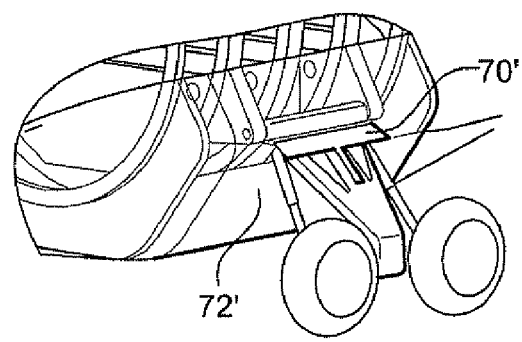
FIG. 11 is a view analogous to the preceding figure showing a variant embodiment.

A variant embodiment of the hatches is shown in FIG. 11. Whereas in the embodiment of FIG. 8, the leg fairing hatch 70 is of a length substantially equal to the length of the upper portion of the leg 14, in the variant of FIG. 11, this length is considerably shorter. The length of the leg fairing 70' is less than half the length of the upper portion, and indeed may be less than one-fourth said length. In compensation, the bottom hatch 72' is longer. The smaller area of the top hatch has the effect of minimizing acoustic nuisance.

Nevertheless, it is possible to arrange the hatches 72 or 72' so that the wheel box 60 is left open. This applies for example if the undercarriage enters into the wheel box by passing through an opening provided in the wall thereof. It is also possible to make provision to close off the space between the wheels (level with the tires) and said opening, once the undercarriage is retracted, by using a device other than a hatch, e.g. an inflatable balloon such as a seal, lip gaskets, or combs.

Because of the position of the pivot axis 18 and the shape of the leg, the width of the track of the main landing gear of the airplane 2 is improved compared with a conventional solution, as illustrated by comparative FIG. 12. In this figure, the airplane 2 of the invention has a conventional airplane with two twin-wheel type main undercarriages 80 drawn superposed thereon. The track or wheel base in the direction Y, or the center-to-center distance, is defined as the distance between the planes of symmetry Q of the main undercarriages. This distance e provided by the airplane of the invention is greater than the corresponding distance d for twin-wheel undercarriages. As shown, the wheels of the undercarriage of the invention may even occupy a position that is further from the plane P than the outer wheels of the twin-wheel undercarriage on an airplane that is otherwise identical.

Because of the above-mentioned planes of symmetry of the undercarriages, symmetry is obtained in the behavior both of the two wheels in each undercarriage and of the main undercarriages relative to each other. Fabrication and maintenance of the undercarriages are also simplified.

In the present example, it should be noted there are no telescopic parts other than the shock absorbers. All of the movements are provided by pivot connections, whether about hinge axes or about ball joints.

The hatches of the undercarriages are also of simple configuration.

The cost of producing the airplane is itself also reduced insofar as the undercarriages are non-invasive relative to the fuselage. This facilitates the takeup of forces by the fuselage without the need to provide arrangements that are excessive. As a result, the empty weight of the airplane is smaller than conventional solutions.

The volume occupied by the undercarriage under the fuselage in the retracted position is smaller in the directions Y and Z. Whatever its position, the entire undercarriage together with its mechanism is situated below the frames. The volume of the hold inside the fuselage is therefore not reduced in any way. Furthermore, in the extended position, the acoustic nuisance generated by the undercarriage is minimized.

The angled shape of the leg enables the linkage of the undercarriage, the movement of the wheels in the vertical direction, and the spacing between the wheels to be optimized.

Figures 13, 14:
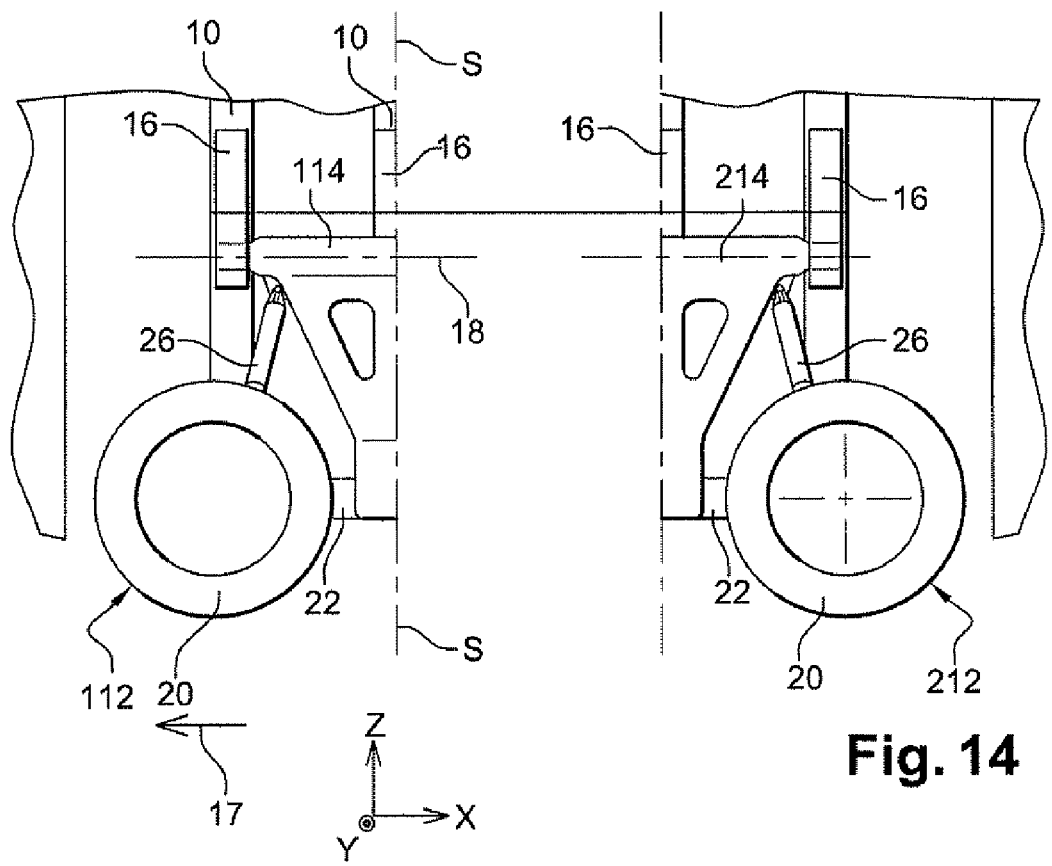
FIGS. 13 and 14 are views analogous to FIG. 1 showing two aircraft undercarriages in other embodiments of the invention.

A second embodiment of the invention is shown in FIG. 13. This figure shows once more a right undercarriage 112. In this embodiment the undercarriage has only one wheel 20. It is assumed that the overall weight of the airplane makes this possible. As in the above-described embodiment, there is a leg 114 carried directly by the fuselage. It carries a single arm 22, itself carrying the wheel 20. In the presence of only one wheel, the shape and the dimensions given to the leg are such that the leg 114 corresponds to the front half of the leg 14 of the first embodiment as shown in FIG. 1, as though it were cut in half on the plane S. This plane is shown in FIG. 13, but it no longer constitutes a plane of symmetry of the undercarriage. The leg shown in side view has the general shape of a right-angled triangle with its hypotenuse facing the wheel 20. As above, the axis 18 passes along the top end of the leg and occupies the same position relative to the fuselage. The front yoke 16 remains unchanged. Given the shape of the leg, the rear yoke 16 in this embodiment is located adjacent to the rear top corner of the leg. The leg is thus carried by two consecutive frames 10 in the succession. In this embodiment, the arm 22 oscillates behind the wheel while the airplane is advancing forwards, as represented by arrow 17, the undercarriage thus presenting a push-arm configuration. The scissor linkage and the actuator are also present, but they are not shown in the Figure.

In the third embodiment shown in FIG. 14, the undercarriage 212 presents a configuration analogous to that of the undercarriage 112 of FIG. 13, except that the shape of the leg 214 corresponds in this example to the rear half of the leg 14 of FIG. 1. The undercarriage 214 is thus symmetrical to the above-described embodiment about the old plane S. The arm 22 is thus located in front of the wheel when the airplane is advancing in its forward direction, so the undercarriage presents a pull-arm configuration.

Naturally, numerous modifications could be applied to the invention without going beyond the ambit thereof.

The shape of the circumference of the fuselage need not be circular. For example it could include lobes or sectors that are rectilinear.

The invention claimed is:

1. An aircraft, comprising a fuselage having frames, wherein each of the frames is a continuous section member in the form of a convex closed curve, and at least two undercarriages each comprising a support and at least one wheel, the support being directly carried by the fuselage and being hinged to the fuselage about an axis lying outside the frames;
   each undercarriage being movable between an operational position in which the at least one wheel is vertical, and a rest position; and
   the support and the at least one wheel having a configuration such that, in the rest position, the undercarriage extends circumferentially relative to the fuselage and outside the frames.

2. An aircraft according to the preceding claim, wherein the support is of a shape such that, in the operational position, the at least one wheel extends outside the axis relative to a horizontal direction perpendicular to a longitudinal direction of the fuselage.

3. An aircraft according to claim 1, wherein the support presents a profile that is angled when seen looking along a direction parallel to the longitudinal direction of the fuselage.

4. An aircraft according to claim 1, wherein the at least one wheel is connected to the support by an arm hinged to the support.

5. An aircraft according to claim 1, wherein the wheels of each undercarriage are at least two in number, all of the wheels of the undercarriage forming a single row of wheels disposed one behind another.

6. An aircraft according to claim 1, wherein each undercarriage has a single wheel.

7. An aircraft according to claim 1, wherein the support is a single part mounted to pivot relative to the fuselage, each undercarriage including at least one arm connected directly to the at least one wheel and to the support.

8. An aircraft according to claim 1, wherein each undercarriage includes at least one shock absorber, the at least one shock absorber being distinct from the support.

9. An aircraft according to claim 1, wherein each undercarriage is arranged in such a manner as to present a plane of symmetry perpendicular to the longitudinal direction of the fuselage.

10. An aircraft according to claim 1, wherein the undercarriages are arranged in such a manner as to be symmetrical relative to each other about the longitudinal vertical midplane of the fuselage.

11. An aircraft according to claim 2, wherein the support is of such a shape that, in the operational position, the at least one wheel extends outside the fuselage relative to the horizontal direction perpendicular to the longitudinal direction of the fuselage.

12. An aircraft according to claim 1, wherein each of the frames extends in a plane perpendicular to a longitudinal axis of the aircraft.

13. An aircraft according to claim 1, wherein the frames extend parallel to one another and are regularly spaced apart from one another.

* * * * *